UNITED STATES PATENT OFFICE.

EDWIN A. SCRIBNER, OF BROOKLYN, NEW YORK.

PROCESS OF MANUFACTURING ARTIFICIAL FERTILIZERS.

SPECIFICATION forming part of Letters Patent No. 283,426, dated August 21, 1883.

Application filed October 7, 1882. (No specimens.)

*To all whom it may concern:*

Be it known that I, EDWIN A. SCRIBNER, a citizen of the United States, and a resident of Brooklyn, in the county of Kings and State of New York, have invented certain new and useful Improvements in Processes of Manufacturing Artificial Fertilizers, of which the following is a full, clear, and exact description.

My invention relates to methods of treating ferruginous and aluminous minerals, commonly known as phosphates of iron and alumina, for the production therefrom of artificial fertilizers.

The object of the process which constitutes my present invention is to render available a larger proportion of the fertilizing principle contained in the mineral than has heretofore been done, or, in other words, to obtain an increased proportion of phosphoric acid from the mineral in a condition suitable for mixing with ammoniacal or other matters in the production of fertilizers.

Heretofore in the treatment of these mineral phosphates the material has usually been calcined or roasted and then combined with sulphuric or other acids, while in many instances other substances have been added and the compounds subjected to various treatments in order to obtain fair results. Over these processes my invention is an improvement, the process which I have discovered being not only more economical, but yielding a very much larger percentage of phosphatic material in a condition known in the art as "reverted" or "available."

My invention, broadly stated, consists in simultaneously exposing ferruginous and aluminous phosphates to the action of applied heat and sulphur, or, in other words, bringing into contact with the phosphates while hot either the vapor of sulphur or sulphurous anhydride. To effect this the mineral may be ground, mixed with a small proportion of granulated or powdered sulphur, and then roasted; or the sulphur may be vaporized or burned in separate receptacles, and introduced in a gaseous state to the heated mineral. With the first of these processes and the several steps involved in its execution my present application is more particularly concerned.

In carrying out my invention I proceed as follows: A proper quantity of the mineral commonly known as phosphate of iron and alumina is primarily crushed or ground in any convenient manner, and with it is intimately mixed a small proportion of granulated or powdered sulphur, the proportion of the latter being about two per cent., by weight. The mixture is then roasted, no special appliance being essential to the ready accomplishment of this step in the process, though an ordinary closed retort is preferable, as by its use much of the sulphur may be saved by sublimation. The physical action of the heat upon the mixture is primarily to dissociate from the mineral phosphates the water contained in them and to vaporize the sulphur, this giving rise to the production of available phosphoric acid, which is probably due to the chemical reaction produced by vapor of sulphurous acid, which is formed in immediate contact with the powdered mineral. The mixture is roasted until this reaction is complete. This may be determined by an examination of the chemical change taking place, or is evidenced by a change in the color and character of the mass, which becomes darker in shade and finer in grain. When these changes have taken place, the roasting may be stopped, though no injurious consequences appear to follow from continuing it for a longer time than is necessary. When thus treated the phosphatic rock is brought to a commercially valuable condition as a fertilizing compound, the proportion of reverted or available phosphate produced by the combined action of the heat and sulphur in the process described being greatly in excess of that produced by any other process of which I am aware. Without further treatment it may be mixed with potash or ammoniacal matters, and used as an artificial manure.

From the chemical changes that take place in the above process—viz., the formation of sulphurous-acid vapor throughout the heated mass—it is obvious that, in lieu of mixing the mineral and sulphur together and then heating them, the mineral alone may be heated and the vapor of sulphur introduced to the heated mass. It is further true that the same results will be reached by the introduction to the heated mass of sulphurous anhydride, and in general the objects of the invention are attained by heating the mineral in the presence of any matters which produce sulphurous acid by chemical union with the constituent parts of the mineral.

I am aware that bones or mineral phosphates have heretofore been mixed with sulphur or compounds containing sulphur, and used in this condition and without further treatment as a fertilizer, and this I do not claim.

What I therefore claim is—

1. The process of manufacturing fertilizing substances from phosphates of iron and alumina, which consists in simultaneously exposing the said mineral to the action of applied heat and sulphur or its equivalent, as described.

2. The process of manufacturing fertilizing substances from phosphates of iron and alumina, which consists in grinding the said phosphates, mixing therewith a small percentage of sulphur, and then roasting the mixture, as and for the purpose set forth.

In testimony whereof I have hereunto set my hand this 29th day of September, 1882.

EDWIN A. SCRIBNER.

Witnesses:
W. FRISBY,
RAYMOND F. BARNES.